(12) United States Patent
Engel et al.

(10) Patent No.: US 11,016,635 B2
(45) Date of Patent: May 25, 2021

(54) LAYOUT SYSTEM FOR DEVICES WITH VARIABLE DISPLAY SCREEN SIZES AND ORIENTATIONS

(71) Applicant: Keysight Technologies, Inc., Minneapolis, MN (US)

(72) Inventors: Glenn R. Engel, Snohomish, WA (US); Jonathan Helfman, Half Moon Bay, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 161 days.

(21) Appl. No.: 15/687,376

(22) Filed: Aug. 25, 2017

(65) Prior Publication Data
US 2017/0357393 A1 Dec. 14, 2017

Related U.S. Application Data

(63) Continuation of application No. 13/838,087, filed on Mar. 15, 2013, now abandoned.

(51) Int. Cl.
*G06F 3/048* (2013.01)
*G06F 3/0482* (2013.01)

(52) U.S. Cl.
CPC .................. *G06F 3/0482* (2013.01)

(58) Field of Classification Search
CPC .................................................. G06F 3/0482
See application file for complete search history.

(56) References Cited

U.S. PATENT DOCUMENTS

2002/0118193 A1* 8/2002 Halstead, Jr. ........... G06T 11/60
345/440
2005/0177798 A1* 8/2005 Thomson ................ G09G 5/14
715/788

(Continued)

FOREIGN PATENT DOCUMENTS

CN 1845054 A 11/2006

OTHER PUBLICATIONS

LayoutManager https://web.archive.org/web/20120406173741/https://docs.oracle.com/javase/tutorial/uiswing/layout/using.html (Year: 2012).*

(Continued)

*Primary Examiner* — Pei Yong Weng (57) ABSTRACT

A method for operating a data processing system having a display screen on which a GUI is displayed is disclosed. The GUI has a plurality of configurations having different aspect ratios or numbers of pixels. The method includes providing a layout description and a runtime system that generates the GUI in response to the layout description and the display configuration. The layout description defines a first container having a plurality of components to be shown in the GUI within a first container space. Each component has a component layout description within the first container. The runtime system automatically allocates the first container space depending on the display configuration, and automatically divides the first container space into a plurality of component spaces. Each component is shown in a corresponding one of the component spaces. The first container space and the component spaces automatically change when the display configuration changes.

8 Claims, 9 Drawing Sheets

(56) References Cited

U.S. PATENT DOCUMENTS

| | | | |
|---|---|---|---|
| 2006/0227153 A1 | 10/2006 | Anwar | |
| 2008/0122796 A1* | 5/2008 | Jobs | G06F 3/0488 |
| | | | 345/173 |
| 2009/0132578 A1* | 5/2009 | Parikh | G06F 16/957 |
| 2013/0021377 A1* | 1/2013 | Doll | G09G 5/14 |
| | | | 345/649 |
| 2013/0076638 A1* | 3/2013 | Sirpal | H04M 1/0206 |
| | | | 345/169 |
| 2013/0083028 A1* | 4/2013 | Milne | G06F 9/451 |
| | | | 345/440 |

OTHER PUBLICATIONS https://web.archive.org/web/20111025163931/htttps://www.oreilly.com/openbook/javawt/book/ch07.pdf (Year: 2011).* http://web.archive.org/web/20110331144058/https://en.wikipedia.org/wiki/Layout_manager (Year: 2011).*

Office Action dated Apr. 26, 2018, China Application No. 201410044826.8.

Office Action dated Dec. 27, 2018, China Application No. 201410044826.8.

Decision of Final Rejection dated Jul. 1, 2019, China Application No. 201410044826.8.

Decision of Final Rejection dated Jul. 1, 2019, China Application No. 20140044826.8.

* cited by examiner

LAYOUT SYSTEM FOR DEVICES WITH VARIABLE DISPLAY SCREEN SIZES AND ORIENTATIONS

RELATED APPLICATION

This application is a continuation of U.S. patent application Ser. No. 13/838,087 filed on Mar. 15, 2013.

BACKGROUND

The design of graphical user interfaces (GUIs) that are to operate across a number of different platforms having different aspect ratios, sizes, and numbers of pixels poses significant challenges. Any given device may have two different aspect ratios that are operative in portrait or landscape mode. The particular mode is triggered by the device orientation during the running of the program, and hence, the program must provide at least two organizations for the GUI. Furthermore, the programmer is faced with the task of designing a GUI that must operate on a number of different devices having screen sizes that vary from a smart phone to a large fixed computer screen.

Many techniques exist for defining a GUI. The two most commonly used are those designed with "Code" where the programmer creates the layout for a specific application using a programmatic interface. Visual Basic or Visual C++ are examples of this type of layout. Another type is a declarative layout in a text form such as HTML or Microsoft XAML. These use the XML structure to map into a structure in the GUI representation.

These existing techniques require the user to define the GUI in terms of elements that have absolute size requirements in one form or another. Such GUIs do not respond well to orientation changes such as switching between portrait and landscape or when switching from a tablet to a phone to a wide screen monitor. One solution to the orientation problem requires that the designer create multiple "layouts" in which each layout is optimized for a different display.

SUMMARY

The present invention includes a method for operating a data processing system having a display screen on which a GUI is displayed. The GUI has a plurality of configurations having different aspect ratios or numbers of pixels. The method includes providing a layout description and a runtime system that generates the GUI in response to the layout description and the display configuration. The layout description defines a first container having a plurality of components to be shown in the GUI within a first container space. Each component has a component layout description within the first container. The runtime system automatically allocates the first container space depending on the display configuration, and automatically divides the first container space into a plurality of component spaces. Each component is shown in a corresponding one of the component spaces. The first container space and the component spaces automatically change when the display configuration changes.

In one aspect of the invention, the layout description defining the first container indicates a vertical or horizontal organization for the components, and the runtime system divides the first container space vertically or horizontally, respectively, assigning each component to a corresponding vertical, or horizontal, space. The relative space assigned to each component is specified by a layout weight parameter that can be altered from a default value by an entry in the layout description. Absent a change in the layout weights of the components, the vertical or horizontal spaces are divided equally.

In another aspect of the invention, a first one of the components includes text to be displayed in the GUI, and the runtime system automatically sets a text font for that component based on a first font group specification in the layout description for that component. If two components have the same font group specification, the runtime system automatically determines a font that ensures that both components have their text properly displayed, the font changing with the display configuration.

DETAILED DESCRIPTION

In general, a GUI according to the present invention is constructed from one or more "components". Each component has a graphical representation and a code section that determines the behavior of the component and how the component is displayed. In general, each component has a default representation that automatically sizes the graphical representation for the amount of space assigned to that component on the current display. When the display changes orientation, the amount of space for the various components also changes, and the graphical representations are adjusted accordingly. A collection of components can be grouped together in a container. The space allocated for the container is divided among the components in the container. There is a default space allocation that is applied unless a different allocation is specified for the container. The entire display is the highest level of container.

The manner in which the present invention provides its advantages can be more easily understood in terms of two types of containers. In the first type of container, referred to as a VGroup in the following discussion, the default space allocation consists of dividing the vertical space in the container equally among the objects in the container. It should be noted that when the display screen changes from portrait mode to landscape mode, the available space in the container changes, the vertical space being reduced and the horizontal space being increased. Hence, each component in the container is assigned a new space when the change in orientation takes place and the components' representations are likewise resized.

The second type of container will be referred to as an HGroup. The default space allocation in an HGroup consists of dividing the horizontal space in the container equally among the objects in the container. Again, when the display screen changes from portrait mode to landscape mode, the available space in the container changes, the vertical space being reduced and the horizontal space being increased.

Figure 1A:
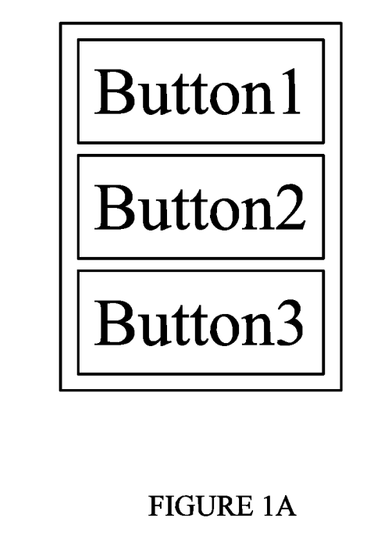
FIGS. 1A and 1B illustrate a VGroup having three buttons in portrait and landscape mode, respectively.
Figure 1B:
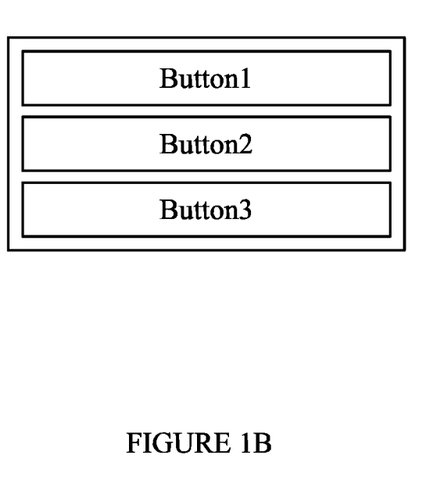

VPanels and HPanels are special types of VGroups and HGroups, respectively, in which the individual components and the panels are automatically provided with borders that delineate the elements in question. Refer now to FIGS. 1A and 1B, which illustrate displays on a data processing system which includes a VGroup having three buttons in portrait and landscape mode, respectively. When the orientation changes from portrait to landscape, the space available for each button changes such that the vertical height of each button is reduced and the width is increased. The fonts are changed accordingly to fit the available space.

In one aspect of the present invention, the user defines the layout of the display in a declarative language such as XML. Only those items that are not contained in the default specification of a component need be included in the file if the containers of the present invention are utilized. For example, the XML, code for the three-button display shown in FIGS. 1A and 1B consists of

```
<Vpanel>
    <Button text="Button1"/>
    <Button text="Button2"/>
    <Button text="Button3"/>
</Vpanel>
```

It should be noted that only the text needs to be specified, as the display space is automatically divided into three vertical sections which are allocated to the various buttons. The code associated with the buttons automatically takes care of sizing the text and buttons for the current display screen and orientation.

In the above-described example, the three buttons have the same size, which is the default allocation. However, the user may wish to provide more space for one of the buttons. In one aspect of the present invention, the user can specify the relative layout weights of the components within a container. The default weight is 1. To change the default layout weight, a corresponding entry is made in the layout file. For example, if the user wishes to assign more space to Button1, the XML file would be

```
<Vpanel>
    <Button text="Button1" layout_weight="2"/>
    <Button text="Button2"/>
    <Button text="Button3"/>
</Vpanel>
```

Figure 2:
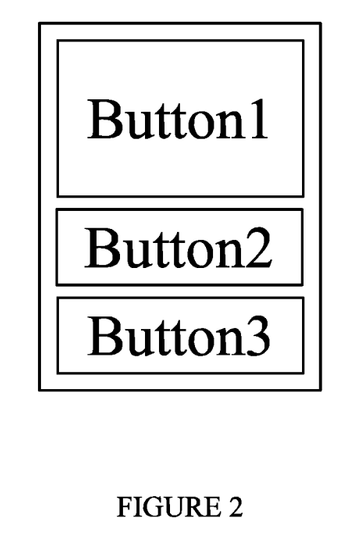
FIG. 2 illustrates a three button VPanel in which the first button has twice the weight of the remaining two buttons.

Refer now to FIG. 2, which illustrates a three button VPanel in which the first button has twice the weight of the remaining two buttons. In this case, Button1 has a height that is twice that of the other two buttons. It should be noted that the width of the button remains the same as that of the other buttons. Since the width limits the font size used for the labels, Button1 has the same font size in as the remaining buttons.

Figure 3:
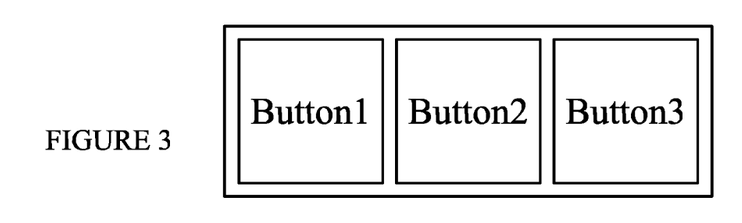
FIG. 3 illustrates the HPanel equivalent of the VPanel shown in FIGS. 1A and 1B.

The present invention also implements a horizontal panel, HPanel, that provides an analogous function to the VPanel described above. In an HPanel, the horizontal space is divided equally. HPanel is the equivalent of the VPanel shown in FIGS. 1A and 1B. The layout file for the HPanel is as follows

```
<Hpanel>
    <Button text="Button1"/>
    <Button text="Button2"/>
    <Button text="Button3"/>
</Hpanel>
```

Figure 4:
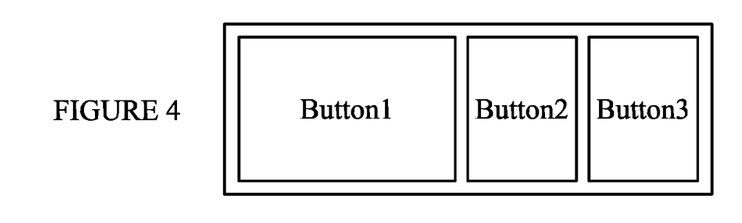
FIG. 4 illustrates the three-button panel with Button1 allocated twice the space of the other buttons.

Refer now to FIG. 4, which illustrates the three-button panel with Button1 allocated twice the space of the other buttons. Again, if more space is to be allocated to one button, the layout weight parameter can again be used. However, since this is an HPanel, the increased layout weight increases the horizontal space allocated to Button1 in the panel rather than the vertical space. The layout file for the HPanel with the increased weight is as follows:

```
<Hpanel>
    <Button text="Button1" layout_weight="2"/>
    <Button text="Button2"/>
    <Button text="Button3"/>
</Hpanel>
```

It should be noted that VPanels and HPanels, as well as the corresponding VGroup and HGroup, are themselves components that obey the same rules as other components. Hence, the various panels and groups can be nested within one another to provide more complex layouts without the need to specify the exact sizes of the components.

Figure 5A:
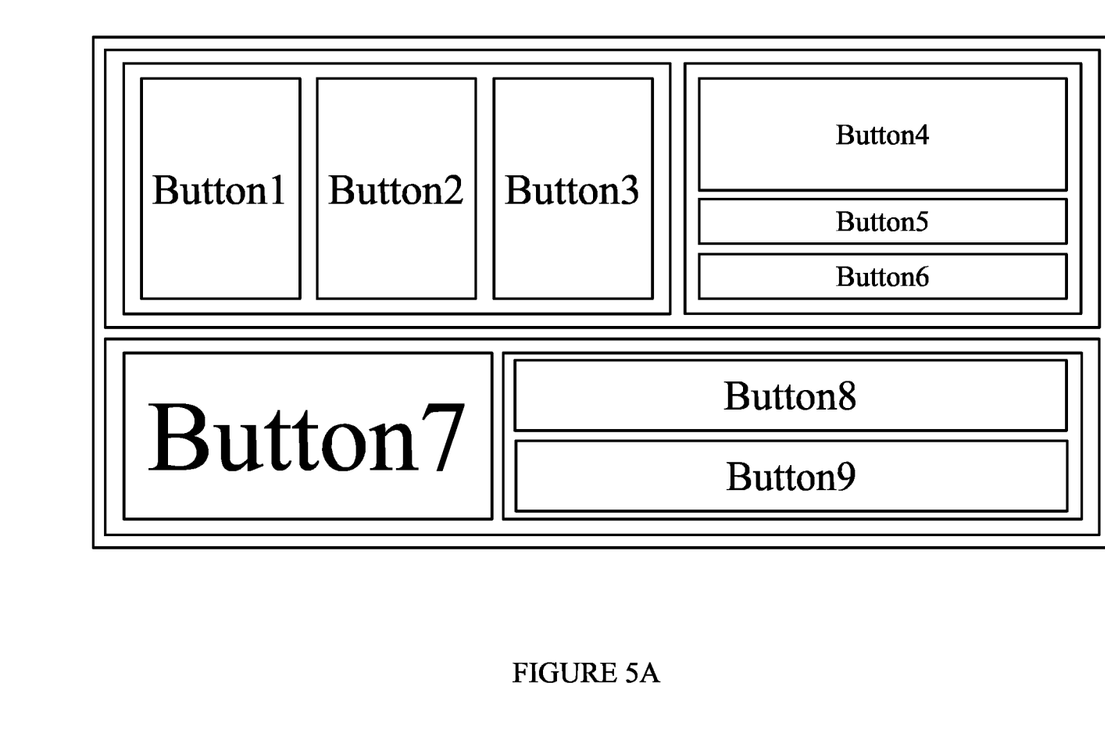
FIGS. 5A and 5B illustrate a nested display in portrait and landscape modes, respectively.
Figure 5B:
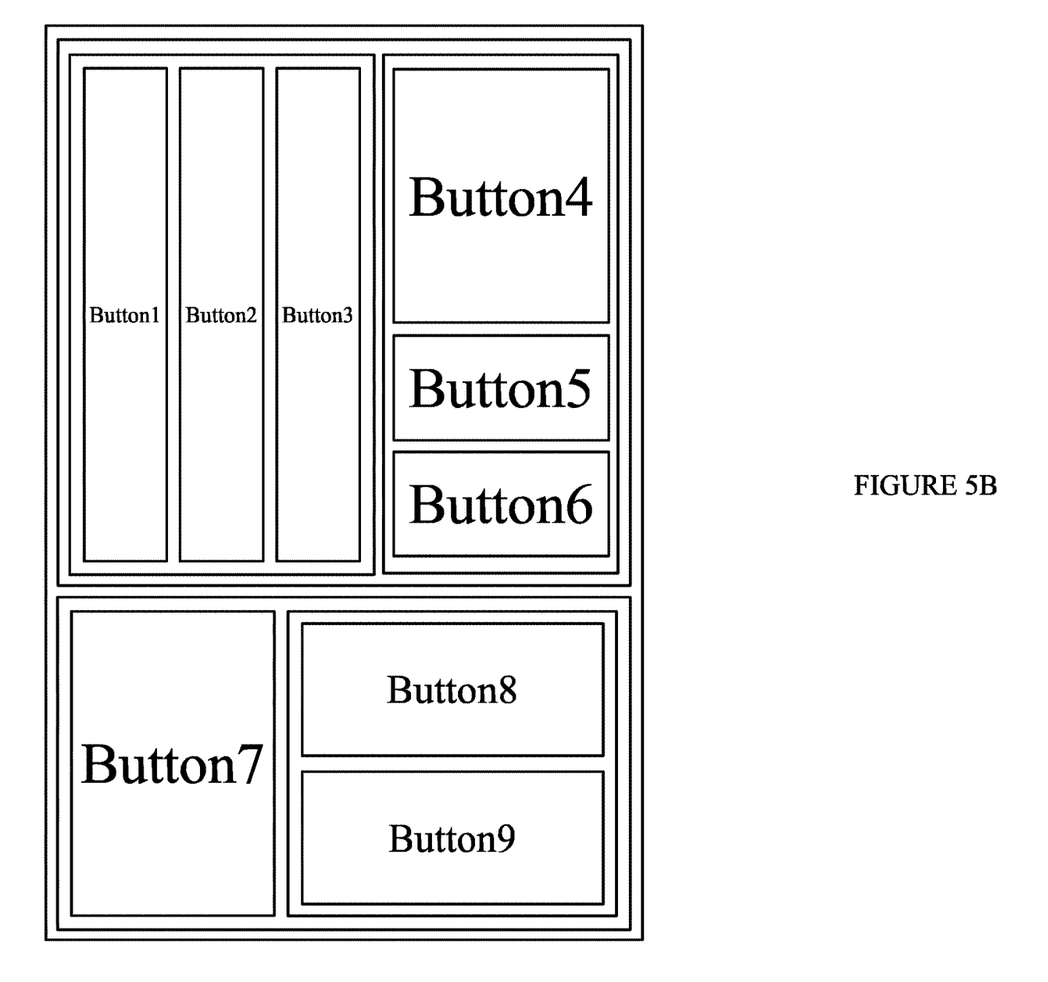

Refer now to FIGS. 5A and 5B, which illustrate a nested display in portrait and landscape modes, respectively. These displays include a number of nested panels. The layout description for the displays in question is as follows:

```
<VPanel>
    <HPanel layout_weight="1.5">
        <HPanel>
            <Button text="Button1"/>
            <Button text="Button2"/>
            <Button text="Button3"/>
        </HPanel>
        <VPanel>
            <Button text="Button4" layout_weight="2"/>
            <Button text="Button5"/>
            <Button text="Button6"/>
        </VPanel>
    </HPanel>
    <HPanel>
        <Button text="Button7"/>
        <VPanel layout_weight="2">
            <Button text="Button8"/>
            <Button text="Button9"/>
        </VPanel>
    </HPanel>
</VPanel>
```

Figure 6A:
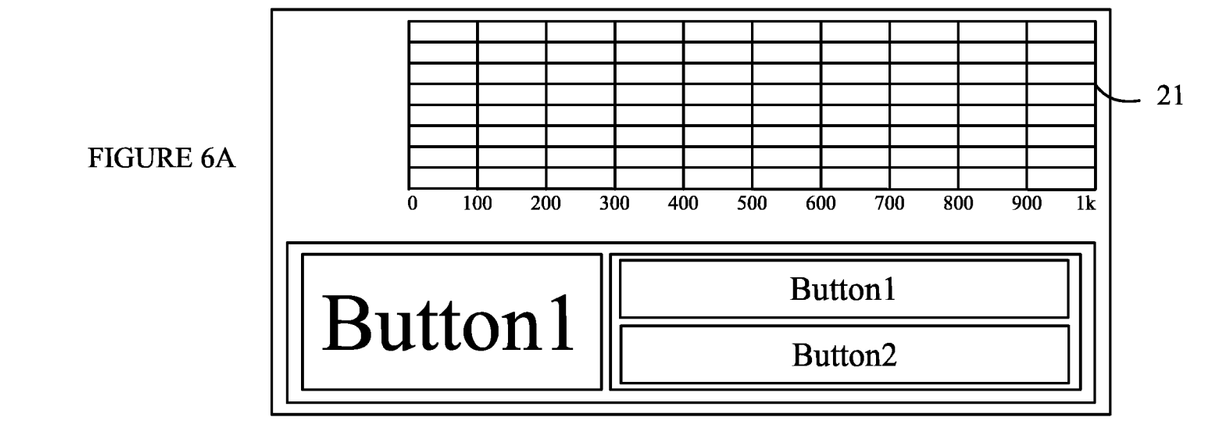
FIGS. 6A and 6B illustrate a nested display that includes a trace component that displays a graphic.
Figure 6B:
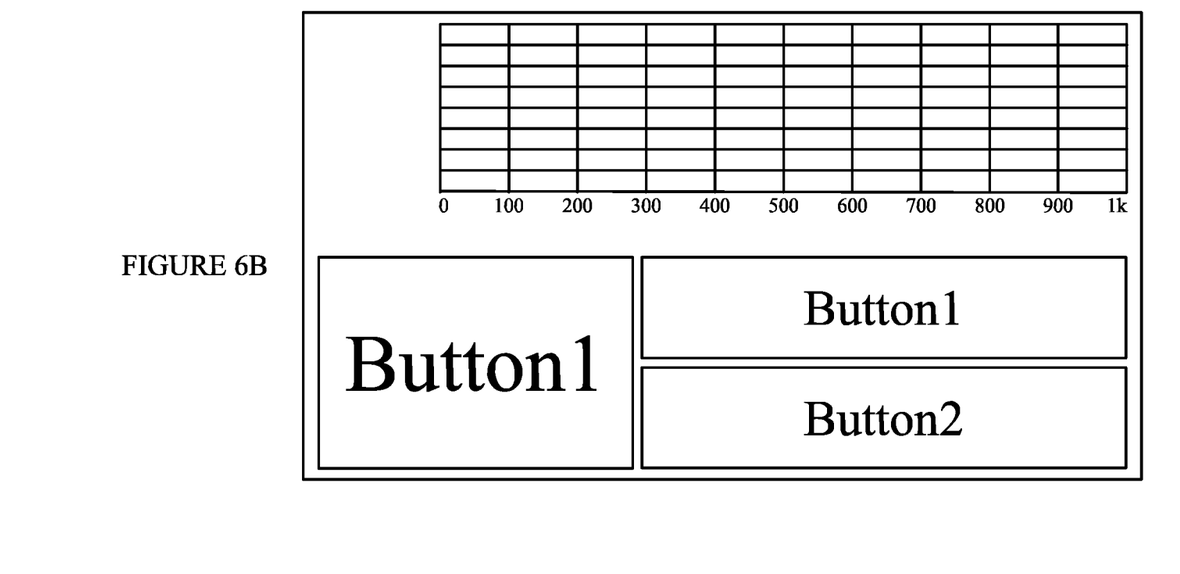

As noted above, a VPanel and an HPanel have a distinctive border around their child components. When nested, HPanel and VPanel components are used for grouping the border shading which can sometimes lead to a cluttered display. The HGroup and VGroup components behave in the same manner as HPanel and VPanel but they do not have a border. In addition, in one aspect of the invention, HGroup and VGroup have a transparent background while HPanel and VPanel do not. This difference is illustrated in FIGS. 6A and 6B, which illustrate a nested display that includes a trace component 21 that displays a graphic. FIG. 6A shows the display when only VPanel and HPanel containers are used. The layout code for FIG. 6A is as follows:

```
VPanel>
    <Trace/>
    <HPanel>
        <Button text="Button1"/>
        <VPanel layout_weight="2">
            <Button text="Button1"/>
            <Button text="Button2"/>
        </VPanel>
    </HPanel>
</VPanel>
```

The corresponding display when HGroups and VGroups are used is shown in FIG. 6B. The layout code for FIG. 6B is as follows:

```
VPanel>
    <Trace/>
    <HGroup>
        <Button text="Button1"/>
        <VGroup layout_weight="2">
            <Button text="Button1"/>
            <Button text="Button2"/>
        </VGroup>
    </HGroup>
</VPanel>
```

In the above described examples, the components have sizes that are automatically computed. However, there are situations in which a designer may prefer to assign specific sizes to one or more of the components. In one aspect of the present invention, components can also have explicit sizes assigned in a manner that is separate from the weight mechanism that assigns relative sizes. Components according to the present invention also have layout_width and layout_height attributes that can be assigned by the designer in the layout code.

Figure 7:
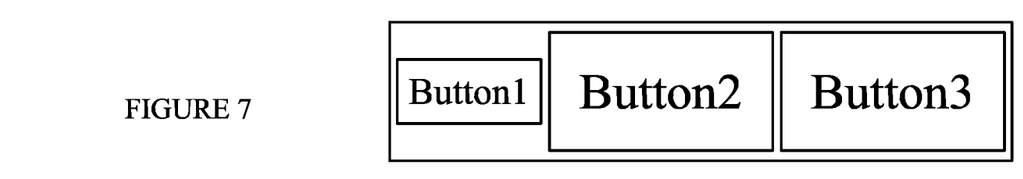
FIG. 7 illustrates a display in which the size of the Button1 component has been explicitly set using layout code.

Refer now to FIG. 7, which illustrates a display in which the size of the Button1 component has been explicitly set using the following layout code:

```
<HPanel>
    <Button text="Button1"
        layout_width="60dp"
        layout height="40dp"/>
    <Button text="Button2"/>
    <Button text="Button3"/>
</HPanel>
```

In this aspect of the invention, the layout width and height can be specified in display pixels, px, scale independent pixels, sp, or density independent pixels, dp. The sp unit selects a font size based on the display screen density as well as the user's font size preference. When this information is not available to an implementation, an sp value is interpreted as a dp value. In general, sp is used when a size is desired relative to user font selection preferences. The dp unit selects a font size based on a density independent pixel. These units are relative to a 160 dpi screen. A dp is one pixel on a 160 dpi screen but two pixels on a 320 dpi screen. For text, sp is preferred because it accommodates the users' font size preference. In general, the px unit should be avoided as it does not scale well between devices.

The introduction of a fixed size component can lead to extra space being available in a container. In one aspect of the present invention, the layout engine that is part of a runtime system library allocates space utilizing the layout description. The space in a container is divided according to the layout_weights of the components in that container. When a component uses less than that component's share of the space, the additional space is divided among the remaining components in proportion to their respective layout_weights. A component in which a fixed width and height have been defined can also have a non-zero layout_weight. In this case, the final space allocated to the component is the sum of the specified fixed width or height and its share of any remaining space. If the designer does not wish the fixed width or height component to be stretched in this manner, a layout_weight of zero can be assigned to that component, and hence, that component will not receive any additional space.

In one aspect of the present invention, components can be reduced in size beyond their intrinsic size that results from assigning fixed widths or heights. Such reductions take place if the available space is less than the sum of the intrinsic sizes of the objects specified through the layout_width and layout_height parameters. In this case, space is taken away from each component based on its layout_weight.

Figure 8A:
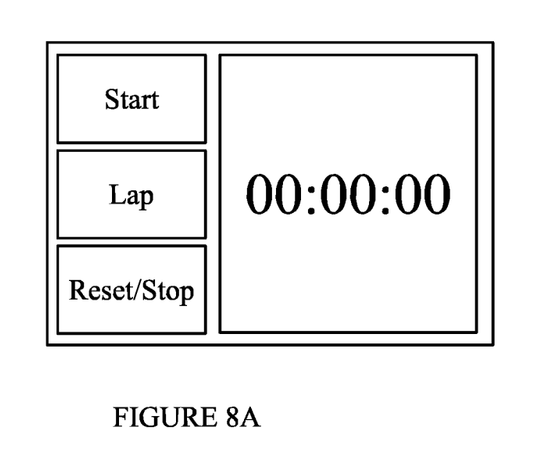
FIGS. 8A and 8B illustrate a GUI that is to run on a device such as a smart phone in either portrait or landscape orientation.
Figure 8B:
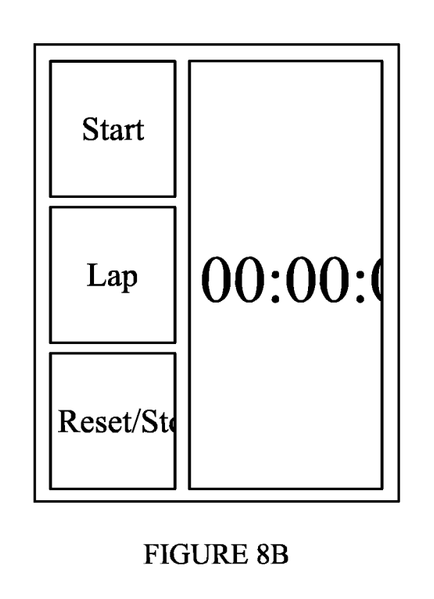

Automatically sizing components that include textual material poses additional challenges. Refer now to FIGS. 8A and 8B, which illustrate a GUI that is to run on a device such as a smart phone in either portrait or landscape orientation. In particular, the GUI includes a number of boxes that include text. The particular GUI in FIG. 8A is running with the device in landscape mode. When the device is rotated to portrait mode as shown in FIG. 8B, the sizes of the boxes are altered to make more efficient use of the display space.

Unfortunately, the text within the box cannot be re-sized with the same degree of flexibility without causing problems. The aspect ratio of the text for a given font is normally fixed. Consider a box that has text that just fits into the box when the screen is in the landscape mode. When the screen is rotated to portrait, the width of the box must be reduced. If the font size is not changed, as shown in FIG. 8B, the original text will no longer fit in the box. Hence, the text size is changed to accommodate the change in orientation. The amount by which the text font size must change to accommodate the change in orientation will be different for different objects in the GUI.

Figure 9A:
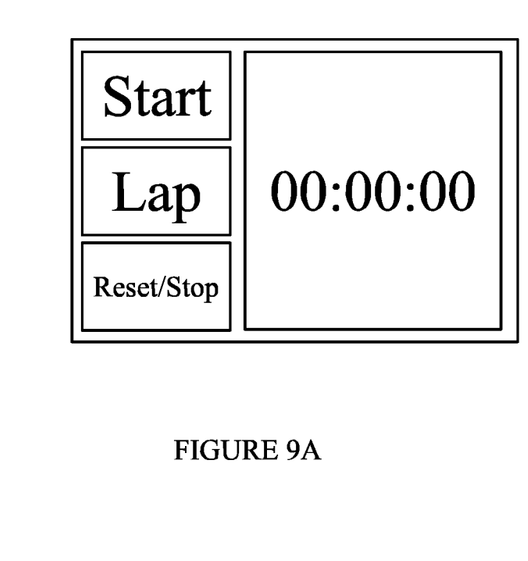
FIGS. 9A and 9B illustrate a display in which the individual components have their fonts adjusted based on the size of the component.
Figure 9B:
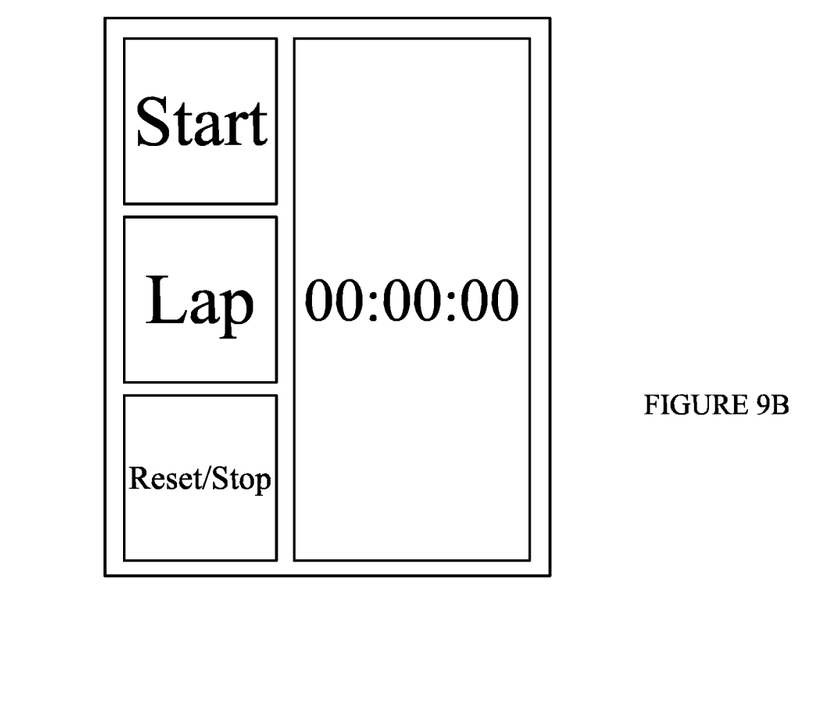

One method for changing the font size involves adjusting the font size to just fit in the object when the object size changes with a change in orientation. Unfortunately, this strategy can result in different components that started with the same text size having different text sizes in the new orientation as can be seen in FIGS. 9A and 9B, which illustrate a display in which the individual components have their fonts adjusted based on the size of the component. FIG. 9A shows the display with the device in landscape mode, and FIG. 9B shows the display with the device in portrait mode. As can be seen from these figures, this approach can lead to a display that lacks the aesthetic qualities of the original display.

Figures 10A, 10B:
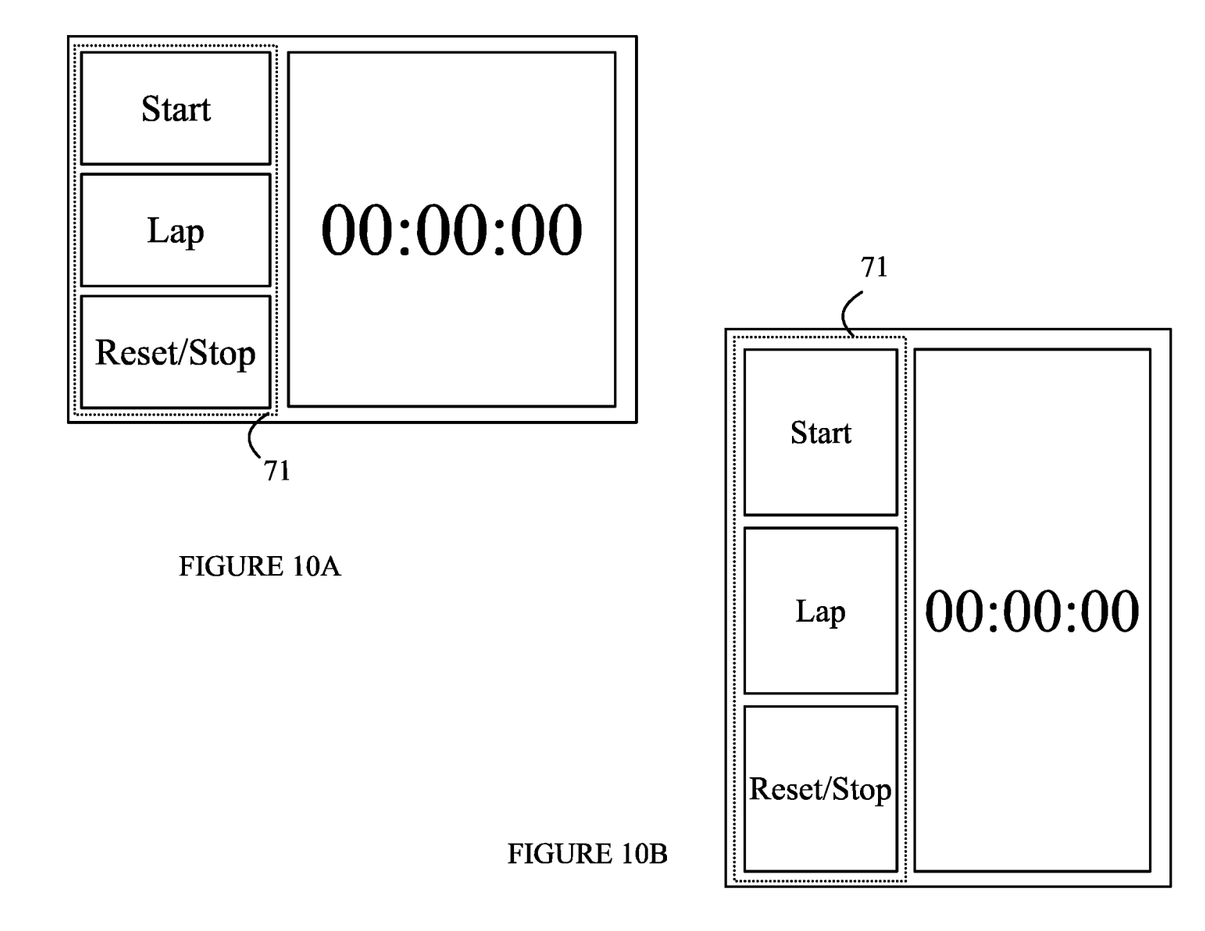
FIGS. 10A and 10B illustrate a display in which the same font size is used for a number of different components.

In one aspect of the present invention, this problem is overcome by defining a group of elements that all need to share the same font size when the orientation or resolution changes to preserve the aesthetic quality of the display. A font group is defined for these elements, and this font is used rather than the font that would have been used by the layout engine in the absence of the font group. Refer now to FIGS. 10A and 10B, which illustrate a display in which the same font size is used for a number of different components even though one or more of the components could have used a different font size. For example, the objects shown at 71 in FIGS. 10A and 10B need to use the same font size in each orientation. The size of the objects changes when the orientation changes; however, the font size remains constant across the objects.

In this aspect of the present invention, a two step process is used for setting the font size for all components of a container that are part of the same group. In the first step, the font size that is required to fit the text into each component is determined. The font size is set such that no object has text that is cut-off in the new orientation. Different components may have different determined font sizes at this step.

In the second step, the minimum of the determined font sizes is then chosen for all of the components in the font group. This ensures that the components have a consistent appearance while ensuring that the text is not cut-off in any of the components. Once a font is determined for each object in a font group, the font is communicated to each object for use by that object.

The font group to which a component is to belong can be specified in the layout description for that component. In the case of the GUI shown in FIGS. 10A and 10B, the XML, description could be as follows:

```
<HPanel>
    <VPanel>
        <Button fontGroup="Buttons" text="Start"/>
        <Button fontGroup="Buttons" text="Lap"/>
        <Button fontGroup-"Buttons" text="Reset/Stop"/>
    </VPanel>
    <HPanel>
        <Text value="00:00:00"/>
    </HPanel>
</HPanel>
```

In some cases, it may be more efficient to define the font group for a "parent" component that includes a number of "children". In this case, the font group assignment applies to all of the children of the parent, e.g.,

```
<HPanel>
    <VPanel fontGroup="Buttons">
        <Button text="Start"/>
        <Button text="Lap"/>
        <Button text="Reset/Stop"/>
    </VPanel>
    <HPanel>
        <Text value-"00:00:00"/>
    </HPanel>
</HPanel>
```

To simplify the layout code, an "implicit font group" is assigned to each container. The implicit font group only applies to the first level of children of the container. It ensures that the first level of children will all have the same font group. An explicit font group assignment is inherited by all of the children of the container. The implicit font group assignment can be avoided by providing a predetermined explicit font group assignment such as "none" or by assigning a property that is incompatible with an implicit font group such as a layout_weight=0.

In another aspect of the invention, Buttons, Text Boxes, and other primarily textual components have a number of additional properties that configure various aspects of the displayed text. The textSize property allows specification of a relative or absolute text size while maxChars specifies the maximum length of a text field.

The textSize property can specify text size in the same units as described for layout size specification. In addition, a % relative size is defined. For text, sp is preferred because it accommodates the user's font size preference. The % unit is a relative automatic font size. When textSize is not specified for a component the layout engine will choose a font size automatically. If the font size is specified with % units the resulting font size will be a percentage of the automatic font size. For example, setting textSize=50% will result in the font size being 50 percent of the automatic font size.

Text size and font group can both be used in the same container. This allows the same automatic font group to be used for all of the elements, except that some of the elements have a reduced font size.

In some cases, the contents of some of the text fields are not known at the time the layout is specified. For example, a text box may be populated by the output of a remote device and the size of the text string will not be known until the text string actually arrives. In one aspect of the present invention, a field property is provided that allows the designer to inform the layout engine of the maximum size of the expected input. This is referred to as the MaxChars property. When the MaxChars property is specified, the textual components choose a text size based on the specified length. The layout engine will then reserve space for that number of characters. If less than that number arrives, the font size is still defined as if the defined maximum number had arrived. This ensures that the appearance of the text does not change from input to input, since the text may change in length during the operation of the GUI.

In anther aspect of the invention, a width or height can be specified to match that of the parent container. A width or height specified as match_parent informs the layout engine that the component should be sized to match its parent container. That is, it will expand to fill available space. Children of HPanel, VPanel, HGroup, and VGroup default to match_parent if an explicit width or height is not specified.

In yet another aspect of the invention, a property that informs the layout engine to size the component just big enough to accommodate its contents is provided. A width or height can be specified as wrap content. This is typically used to wrap a set of fixed sized components. For example, a VPanel with the layout height="wrap content" around a fixed size Text component would result in a panel just big enough to surround the text.

If the children in a container have either fixed or intrinsic sizes and the designer does not wish to calculate the minimum size container that will contain the children, the designer can use a special version of the VPanel and HPanel containers referred to as VWrap and HWrap, respectively. These containers automatically set the height or width of the container to a value that is just big enough to fit all of the children in the container.

The positioning of a component in a container can be explicitly controlled using two position specification parameters. A container can specify a layout for all of the children in the container by specifying a value for a parameter, "gravity". For example, if gravity="left", all of the components in a container will be aligned on the left boundary of the container. In some cases, the designer may wish to explicitly specify the position of one of the components in a container without altering the positioning of the remaining contacts. The parameter, "layout_gravity" allows a component to define its position within the parent container. The values of gravity and layout_gravity do not affect the size of the components. For a vertical orientation container such as a VPanel, lay_out gravity can take on the values "left", "center", or "right", which result in the object being aligned with the left boundary of the container, the center of the container, or the right boundary of the container, respectively. For a horizontal orientation container such as an HPanel, lay_out gravity can take on the values "top", "center", or "bottom", which result in the object being aligned with the top boundary of the container, the center of the container, or the bottom boundary of the container, respectively. In addition, layout_gravity can have the values "center_vertical" and "center_horizontal that signal that the object is to be vertical center of its container or the horizontal center of its container, respectively.

The above-described embodiments utilize containers referred to as VGroup and HGroup. However, embodiments of the present invention that utilize different types of containers in which the component sizes are automatically set can be constructed. For example, a SwipePanel is defined in one embodiment of the present invention. The children of this panel are "pages" in a multi-page view in which the user moves between pages using a gesture such as a swipe gesture or "pushing" a button. A SwipePanel is equivalent to a display that is much larger than that provided on the device. The allocated space on the device is a "window" on the larger display. The positioning of the window is determined by the swipe gesture and the current position. In essence, the swipe moves the relative position of the window and the underlying display so that a different portion of the underlying display appears in the window after the gesture.

The children of the SwipePanel may be arranged in a manner that depends on whether the device is in portrait or landscape mode. In one aspect of the invention, each child occupies a space on the display such that one child is visible at any time and fills the allocated space. The user changes children by performing the swipe gesture which replaces the currently visible child with one to the left or right of the current child, depending on the direction of the swipe.

The drawings in the present application show various display arrangement of components on a display of a data processing system or computer. The data processing system or computer is not explicitly shown as a separate "box", since such components are well known in the art. However, it is to be understood that such displays also indicate the present of the underlying data processing system or computer and are a representation of the data processing system or computer as well as the display.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a computer within a handheld device having first and second orientations and a display screen characterized by a physical size on said handheld device on which a GUI is displayed, said GUI having first and second configurations depending on said first and second orientations, respectively, said GUI being characterized by a maximum amount of space on said display screen, said method comprising
   providing a layout description on said computer; and
   providing a runtime system on said computer that generates said GUI in response to said layout description and said configuration each time said orientation changes,
   said layout description defining a first container having a plurality of components to be shown in said GUI within a first container space, each component having a component layout description within said first container, said layout descriptions for said first container and said components being independent of said first and second orientations, wherein
   said runtime system automatically detects said changes in said orientation of said handheld device, automatically determines a space available for said first container in said GUI and automatically allocates said first container space using said layout description each time said orientation changes, said first container space depending on said display configuration, wherein said layout description specifies an amount of space on said GUI that is allocated to said first container in each of said first and second configurations, said amount of space in said first configuration being different than said amount of space in said second configuration and wherein said amount of space allocated to said first container is less than said maximum space.

2. The method of claim 1 wherein said layout description defining said first container has N components and indicates a vertical or horizontal organization for said N components and wherein said runtime system divides said first container space vertically or horizontally, respectively, into exactly N spaces, assigning each component to a corresponding one of said vertical or horizontal spaces, respectively.

3. The method of claim 2 wherein said space assigned to each component is equal to said space of each other component.

4. The method of claim 2 wherein said layout description specifies a layout weight for each of said components in said first container and wherein said runtime system divides said vertical or horizontal space assigned to said first container in a manner that depends on said layout weights such that said components having higher weights are assigned more space than said components having lower weights.

5. The method of claim 1 wherein one of said components comprises a second container.

6. The method of claim 1 wherein said runtime system sets font and font size for a first and a second text objects having a common font group designation in said layout description if said first and second text objects would have different fonts or font sizes if said first and second text objects did not have said common font group designation and said font and/or font size of one of said text objects would be different from said font and/or font size of said other of said text objects.

7. The method of claim 6 wherein text for said text of said second text object has a different size than said text of said first text object, said size difference being determined by a text size specification in said layout description.

8. The method of claim 1 wherein said runtime system positions one of said components in said first container based on a position specification in said layout description for said component.

* * * * *